No. 719,440. PATENTED FEB. 3, 1903.
F. E. DAVIS.
TOOL HANDLE.
APPLICATION FILED APR. 4, 1902.
NO MODEL.
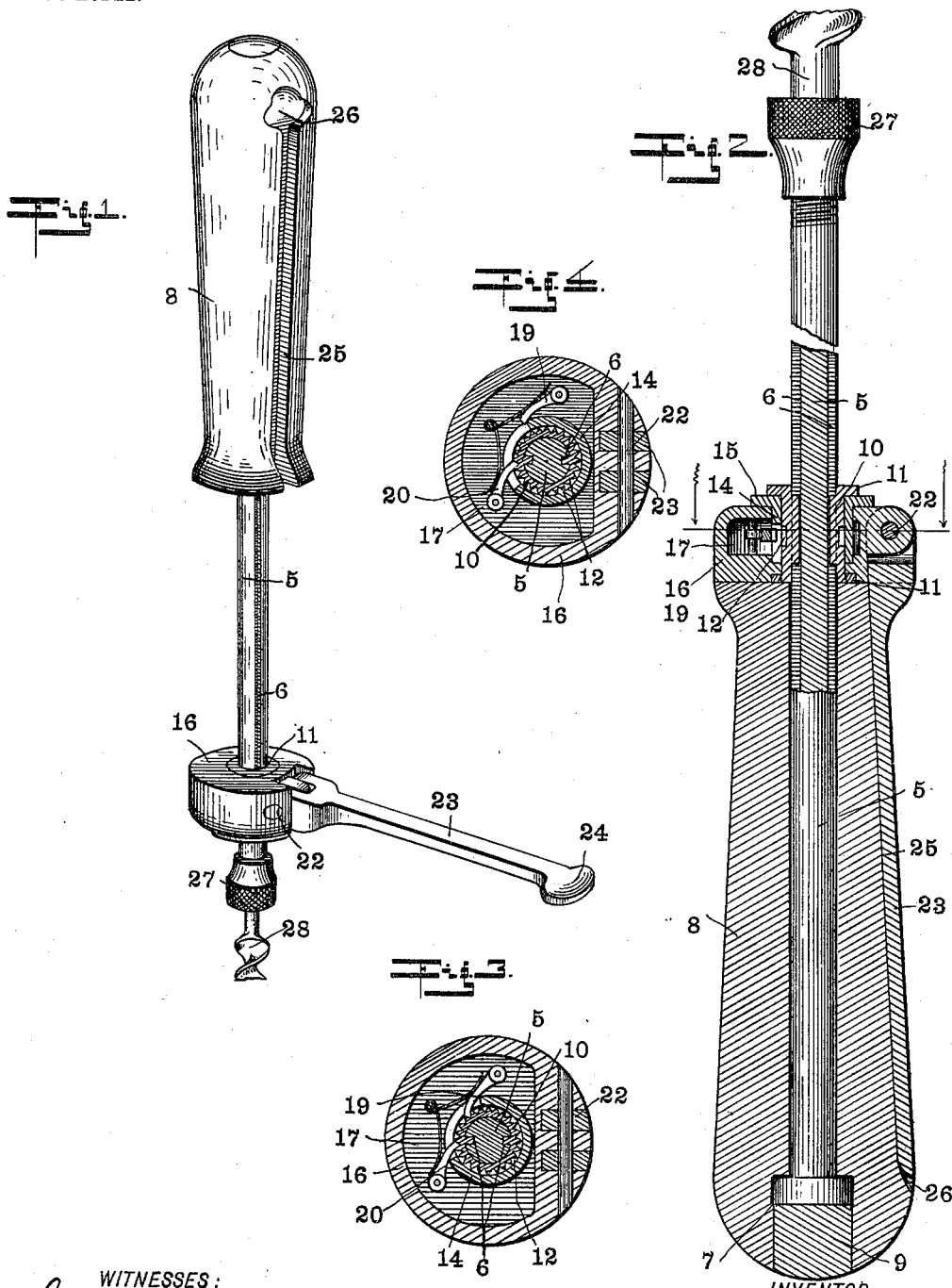
WITNESSES:
Frank A. Fahle
J. A. Walsh
INVENTOR
Frank. E Davis.
BY
Bradford & Hood
ATTORNEYS

UNITED STATES PATENT OFFICE.

FRANK E. DAVIS, OF INDIANAPOLIS, INDIANA.

TOOL-HANDLE.

SPECIFICATION forming part of Letters Patent No. 719,440, dated February 3, 1903.

Application filed April 4, 1902. Serial No. 101,336. (No model.)

*To all whom it may concern:*

Be it known that I, FRANK E. DAVIS, a citizen of the United States, residing at Indianapolis, in the county of Marion and State of Indiana, have invented certain new and useful Improvements in Tool-Handles, of which the following is a specification.

The object of my invention is to produce a tool handle or receiver having a ratchet connection between its shank and the hand-grip and of such character that a lever forming part thereof may be disconnected from the grip and thrown down at right angles to the shank, so as to form an operating-lever for the shank.

The accompanying drawings illustrate my invention.

Figure 1 is a perspective view of my tool-handle with the ratchet mechanism disconnected from the grip and the lever thrown down at right angles to the shank. Fig. 2 is an axial section thereof with the ratchet mechanism connected to the grip. Fig. 3 is a transverse section on line 3 3 of Fig. 2. Fig. 4 is a view similar to Fig. 3, one of the pawls having been thrown out of operative position.

In the drawings, 5 indicates a shank having suitable longitudinal keyways 6 formed therein and also having an enlarged head 7 at one end. Sleeved upon shank 5, so as to be freely rotatable thereon, is a handle or grip 8, which is so formed at its outer end as to receive head 7, a plug 9 being used in the usual manner to prevent longitudinal movement of the grip upon the shank. Keyed upon shank 5 is a sleeve 10, which is provided at its ends with flanges 11 11, and formed in the periphery of said sleeve, about midway of its length, is a series of ratchet-teeth or recesses 12. Sleeved upon sleeve 10 and extending down over teeth 12 is a pawl-guard 14, having an outside operating head or flange 15. Sleeved upon sleeve 10 and guard 14 is a head 16, provided with an internal chamber 17, in which are pivoted two oppositely-arranged pawls 19 and 20, which are spring-pressed into engagement with the ratchet-teeth 12. A portion of the guard 14 is cut away to allow the pawls to simultaneously engage the ratchet-teeth, and the shoulders 19 and 20, formed by the cutting, serve to withdraw one or the other of the pawls from operative position by shifting the guard in the proper direction.

Pivoted at 22 to head 16, so that it may be thrown parallel to the shank or at right angles thereto, is a lever 23, having an enlargement 24 at its free end. Lever 23 when thrown parallel to the shank 5 is adapted to fit within an axial groove 25, formed in the grip 8, and the enlargement 24 of the lever passes into the recess 26, formed at the end of the groove 25, the arrangement being such that the main body of the lever when lying within the groove will lock the head 16 to the grip, so as to prevent relative turning thereof, and the enlargement 24, lying within recess 26, will prevent an axial movement of the head 16 from the grip 8.

The free end of shank 5 may itself be formed into any desired tool; but I prefer to mount thereon a tool-receiving clutch 27, of any desired pattern, adapted to receive a tool 28 in the usual well-known manner. It is to be understood that my invention is not to be limited to any particular form of tool or whether the same be integral with or detachable from the shank 5.

When the parts are in the positions shown in Fig. 2, head 16 is keyed to the grip 8 by lever 23, and sleeve 10 is of course keyed to the shank 5. Grip 8 may therefore be used like the usual screw-driver grip to drive the shank positively in either or both directions, depending upon the position of the pawl-guard with relation to the pawls. In case a greater driving power is required the operator merely throws lever 23 out of groove 25 and swings the same down at right angles with the head 16, so as to thus form an operating-lever for the head and the shank keyed thereto, the grip being used to steady and guide the tool while the shank rotates freely therein. Head 16 may or may not be slipped axially upon the shank, as may be desired. If an additional keyed connection between head 16 and grip 8 be desired, such a connection may be made, and in such case an axial movement of the head with relation to the grip would have to be made before the head could be independently rotated.

I claim as my invention—

1. A tool-handle consisting of, a shank, a sleeve keyed upon the shank and axially movable thereon and having a series of ratchet-teeth formed on its periphery, a head surrounding said sleeve and axially movable upon the shank with said sleeve, a lever pivotally connected to the sleeve, a pair of ratchet-pawls carried by said head, means carried by the head for controlling the action of the pawls upon the ratchet, and a grip rotatable upon the shank and provided with means to receive the lever whereby the head may be connected to or detached from the grip.

2. A tool-handle consisting of a shank, a sleeve keyed upon the shank and axially movable thereon and having a series of ratchet-teeth formed on its periphery, a pawl-guard sleeved upon the sleeve, a head rotatable on the sleeve, a pair of pawls carried by the head and adapted to engage the teeth of the sleeve, a lever pivoted upon the head, and a grip rotatably mounted on the shank and provided with a recess into which the lever may be thrown, substantially as and for the purpose set forth.

In witness whereof I have hereunto set my hand and seal, at Indianapolis, Indiana, this 27th day of March, A. D. 1902.

FRANK E. DAVIS. [L. S.]

Witnesses:
JOHN B. McCOY,
ARTHUR M. HOOD.